(12) United States Patent
Ibrahim

(10) Patent No.: US 8,489,438 B1
(45) Date of Patent: Jul. 16, 2013

(54) METHOD AND SYSTEM FOR PROVIDING A VOICE REVIEW

(75) Inventor: Hisham Ibrahim, Aptos, CA (US)

(73) Assignee: Intuit Inc., Mountain View, CA (US)

( * ) Notice: Subject to any disclaimer, the term of this patent is extended or adjusted under 35 U.S.C. 154(b) by 2006 days.

(21) Appl. No.: 11/394,568

(22) Filed: Mar. 31, 2006

(51) Int. Cl.
*G06Q 10/00* (2012.01)

(52) U.S. Cl.
USPC .......... 705/7.11; 705/7.38; 705/347; 701/468

(58) Field of Classification Search
USPC ............... 705/7.11, 7.38, 7.39, 14.62, 14.63, 705/26.7, 347; 701/468, 487
See application file for complete search history.

(56) References Cited

U.S. PATENT DOCUMENTS

| | | | | |
|---|---|---|---|---|
| 6,064,980 | A * | 5/2000 | Jacobi et al. .................. 705/26.7 |
| 6,631,184 | B1 * | 10/2003 | Weiner ........................ 379/92.01 |
| 6,895,385 | B1 * | 5/2005 | Zacharia et al. .............. 705/7.29 |
| 6,963,848 | B1 * | 11/2005 | Brinkerhoff .................. 705/7.32 |
| 7,080,064 | B2 * | 7/2006 | Sundaresan ........................... 1/1 |
| 7,519,562 | B1 * | 4/2009 | Vander Mey et al. .......... 705/500 |
| 7,613,717 | B1 * | 11/2009 | Reed et al. ............................ 1/1 |
| 2002/0035474 | A1 * | 3/2002 | Alpdemir ....................... 704/270 |
| 2002/0138338 | A1 * | 9/2002 | Trauth et al. .................... 705/10 |
| 2003/0131355 | A1 * | 7/2003 | Berenson et al. ................ 725/46 |
| 2003/0216962 | A1 * | 11/2003 | Heller et al. ..................... 705/14 |
| 2003/0229497 | A1 * | 12/2003 | Wilson et al. ................ 704/270.1 |
| 2005/0010411 | A1 * | 1/2005 | Rigazio et al. ................. 704/246 |
| 2005/0034071 | A1 * | 2/2005 | Musgrove et al. ............. 715/530 |
| 2005/0130676 | A1 * | 6/2005 | Broussard et al. .......... 455/456.6 |
| 2006/0129446 | A1 * | 6/2006 | Ruhl et al. ....................... 705/10 |
| 2006/0130121 | A1 * | 6/2006 | Candelore et al. ............. 725/145 |
| 2006/0143068 | A1 * | 6/2006 | Calabria ......................... 705/10 |
| 2007/0143122 | A1 * | 6/2007 | Holloway et al. ................. 705/1 |
| 2009/0048823 | A1 * | 2/2009 | Liu et al. ............................ 704/9 |

OTHER PUBLICATIONS

C. Dellarocas, "Immunizing Online Reputation Reporting Systems Against Unfair Ratings and Discriminatory Behavior", Proceedings of the 2nd ACM Conference on Electronic Commerce, Minn, MN, Oct. 17-20, 2000.*

P. Resnick et al. "Trust Among Strangers in Internet Transaction: Empirical Analysis of eBay's Reputation System", Working Paper for the NBER Workshop on Empirical Studies of Electronic Commerce, pp. 1-26, drafted Feb. 5, 2001.*

Zheng et al. "Mining Interesting Locations and Travel Sequences from GPS Trajectories", Apr. 2009, WWW 2009 Proceedings of the 18th International Conference on World Wide Web, 10 pgs.*

* cited by examiner

*Primary Examiner* — Jonathan G Sterrett
*Assistant Examiner* — Stephanie Delich
(74) *Attorney, Agent, or Firm* — Osha Liang LLP

(57) ABSTRACT

A method for evaluating an entity that includes identifying an entity identifier for the entity, recording a voice review for the entity associated with the entity identifier, and submitting the voice review and the entity identifier to a review framework.

20 Claims, 6 Drawing Sheets

METHOD AND SYSTEM FOR PROVIDING A VOICE REVIEW

BACKGROUND

When a consumer receives service at a business establishment, such as at a restaurant or a electronics store, the user forms an opinion about the service received. For example, a user may receive exceptional or poor service, which may influence the consumer's willingness to return for that service at that particular location of the business establishment. Consumer opinions may also influence others to whom the consumer provides his/her opinion (e.g., friends, family, etc.). Today, with websites that specialize in posting consumer reviews of business establishments in the service industry, consumers that receive any type of service are able to provide his or her opinion to any other current or potential consumer of the same or similar type of service (e.g., vacation spots, restaurants, retail store services, guest speakers at business conventions, etc.).

Generally, to provide feedback, a consumer may use an online database that collects rating information regarding a particular business establishment at a location. More specifically, a consumer typically uses a computer (or other electronic device) to provide feedback to a database that collects and displays rating information related to a service received at a particular location (or at a business establishment located at a particular location).

For example, consider the scenario in which a consumer is dining at a restaurant. The consumer typically forms an opinion while eating and waits until after the meal has completed and after retuning home to provide a review of the restaurant for other potential consumers. Conventionally, this involves the consumer posting his/her opinion about the quality of the food, the ambiance of the restaurant, etc., on a website using a personal computer from his/her home or office. Occasionally, a consumer may attempt to show emotion behind the review by providing a written review using capital letters and/or extreme words.

As another example, consider the scenario in which a participant attends a convention with multiple guest speakers at different times of the day and several booths set up for different services being offered. In this case, the participant may wish to rate the different booths based on a set of criteria or rate the guest speakers on the quality of the presentation. Typically, the participant may offer his/her opinion after the convention has completed by providing evaluations cards or surveys that are taken by the organization that set up the convention. Alternatively, the participant may post ratings of the convention in general on a website.

Most consumers that provide reviews about an entity often have a strong emotion regarding the business establishment. Specifically, consumers who do not have a strong emotion about the service received at the entity rarely have the desire to spend the time necessary to review the business establishment. For example, a consumer who receives poor service at a restaurant often provides a review of the restaurant. Likewise, user who receives exceptional service also provides a review the restaurant. However, users who receive acceptable or slightly better than average service often do not provide a review of the service received at the restaurant.

When a person (i.e., an evaluator) is attempting to evaluate an entity using the reviews provided by consumers, the evaluator must shift though multiple reviews and evaluate the business establishment using solely the text of the review provided. Specifically, using only the text of the review for the business establishment, the evaluator must determine the helpfulness, accuracy, veracity, tone, etc. of the review. Ultimately, the consumer makes a decision whether to consume the service offered by the business establishment based on the review.

SUMMARY

In general, in one aspect, the invention relates to a method for evaluating an entity that includes identifying an entity identifier for the entity, recording a voice review for the entity associated with the entity identifier, and submitting the voice review and the entity identifier to a review framework.

In general, in one aspect, the invention relates to a method for evaluating an entity that includes submitting a search request that includes a search criteria, receiving an evaluation list matching the search criteria, selecting a voice review using the evaluation list, wherein the voice review is associated with the entity, and processing the voice review to determine an action related to the entity.

In general, in one aspect, the invention relates to a data structure for a review map that includes a first element that includes an entity identifier of an entity, a second element that includes a voice review of the entity, and a third element that includes a voice review identifier associated with the voice review, wherein at least one selected from a group consisting of the first element, the second element, and the third element are accessed within a review framework to evaluate the entity.

In general, in one aspect, the invention relates to a system for providing information about an entity that includes a review map for receiving a plurality of voice reviews associated with the entity, and a review engine configured to receive a selection of a selected voice review of the plurality of voice reviews, obtain the selected voice review from the review map, and output the selected voice review for the entity.

Other aspects of the invention will be apparent from the following description and the appended claims.

DETAILED DESCRIPTION

Figure 1:
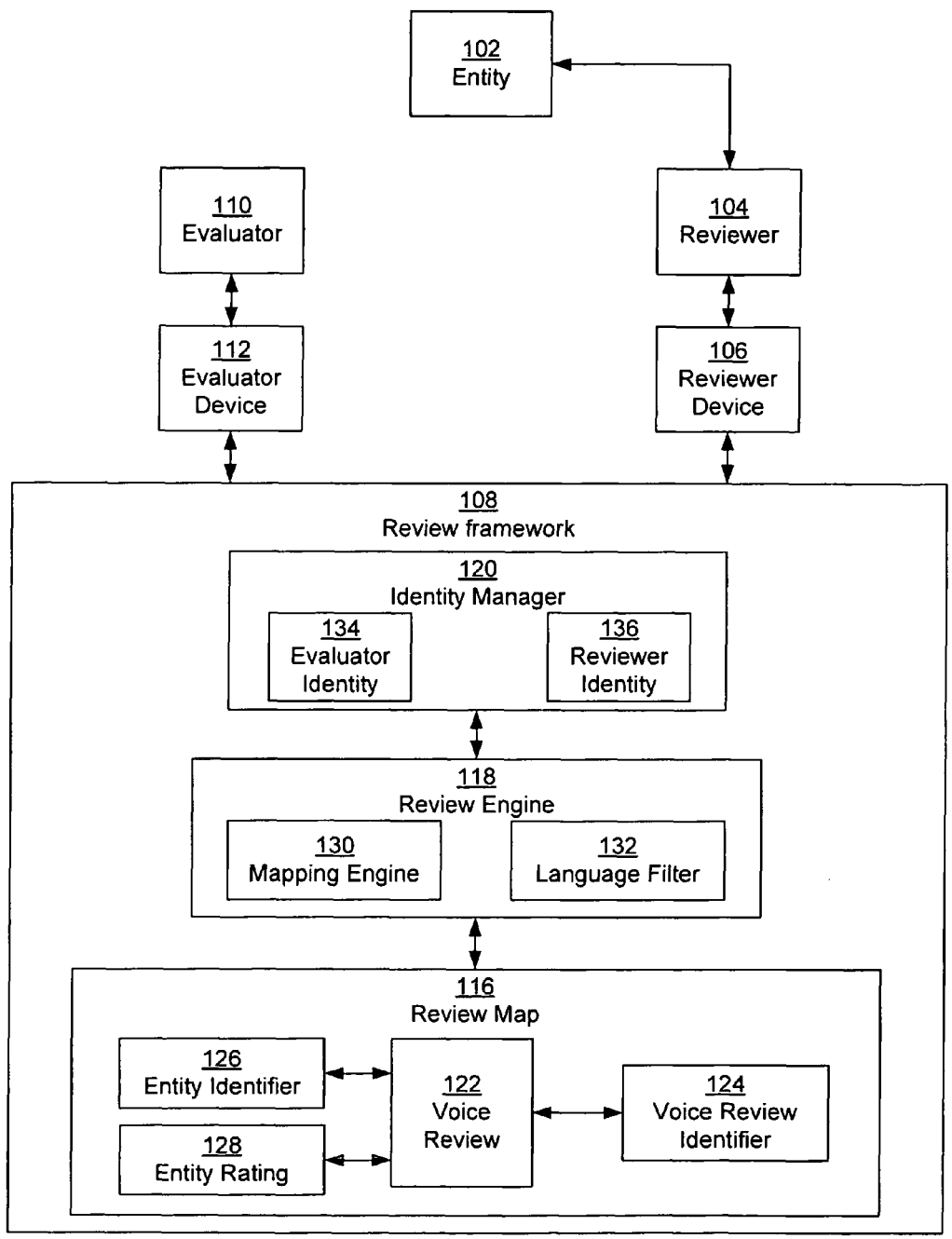
FIG. 1 shows a schematic diagram of a system for evaluating an entity in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to provide review and evaluation of an entity. Specifically, embodiments of the invention use voice reviews to provide the information about the entity. A reviewer in virtually any location may generate a voice review of the entity at a time closer to receiving the service from the entity being reviewed.

FIG. 1 shows a schematic diagram of a system for evaluating an entity in accordance with one or more embodiments of the invention. As shown in FIG. 1, the system includes an entity (102), a reviewer (104), a reviewer device (106), a review framework (108), an evaluator (110), and an evaluator device (112). Each of these components is described below.

In one or more embodiments of the invention, an entity (102) corresponds to any type of good, service, organization, or other such item that may be evaluated by a consumer of the item. For example, an entity (102) may correspond to a non-profit organization, software, a retailer, a product, a business establishment, a service, company, or any other such item. Each entity (102) may be associated with one or more attributes (not shown). An attribute corresponds to a descriptive component of the entity. For example, an attribute may correspond to a physical location, amount of the entity (e.g., retail price, etc.), an entity category (i.e., the type of entity), etc. In the example, an entity may have the attributes of a location (e.g., the greater bay area of California), an entity category (e.g., seafood restaurants), and average price of a meal.

In one or more embodiments of the invention, an entity (102) is associated with a reviewer (104). A reviewer (104) corresponds to a user that has experience with the entity (102). For example, the reviewer may have used the entity, received a service from the entity, invested in the entity, etc. In one or more embodiments of the invention, the reviewer corresponds to a social reviewer. The social reviewer is classified as someone that is a third party not affiliated with the entity or a company that reviews entities. Further, except for promotional material, a social reviewer does not receive compensation for the review or review entities professionally.

A reviewer device (106) is typically used by the reviewer (104) to review the entity (102) in accordance with one or more embodiments of the invention. In one or more embodiments of the invention, the reviewer device (106) corresponds to hardware and/or software required to obtain the review on a recording medium (e.g., electronic signals, magnetic signals, any type of memory, etc). For example, the reviewer device (106) may correspond to a cellular phone, personal digital assistant (PDA), landline-based phone, microphone, video camera, computer, a voice review specific device, or any other such device. One skilled in the art will appreciate that the reviewer device (106) may be owned by the reviewer (104), associated with the entity (102), or associated with a third party.

Further, the reviewer device (106) may include a user interface (not shown) or include functionality to provide access to a user interface. In one or more embodiments of the invention, the user interface includes functionality to identify the reviewer and entity, and obtain a voice review.

Continuing with FIG. 1, the reviewer device (106) is disposed between the reviewer (104) and a review framework (108) in accordance with one or more embodiments of the invention. The review framework (108) corresponds to a backend portion of the system, which includes functionality to manage the system. Specifically, the review framework (108) includes functionality to receive a voice review (122) from a reviewer device (106). Accordingly, in one or more embodiments of the invention, the review framework (108) includes an application programming interface and/or user interface (not shown) to help facilitate such functionality. The review framework (108) also includes a review map (116), review engine (118), and an identity manager (120) in accordance with one or more embodiments of the invention. Each of these components is described below.

A review map (116) corresponds to a storage unit (e.g., file system, database, directory server, disks, or any other storage system) for voice reviews. Accordingly, the review map (116) includes a least one voice review (122), a voice review identifier (124), an entity identifier (126), and an entity rating (128) in accordance with one or more embodiments of the invention.

A voice review (122) corresponds to an auditory review of an entity (102). In one or more embodiments of the invention, the voice review (122) is spoken by the reviewer (104) and maintained by the review map (116) in an audio format. Specifically, in one or more embodiments of the invention, the audio format of the voice review (122) corresponds to a .wav file, .mpg file, or any other format that includes functionality to maintain human voice inflections.

Further, in one or more embodiments of the invention, a voice review (122) may also include a video component as well as an audio component, or may correspond to only the video component. Specifically, the voice review (122) may not only include the voice of the reviewer (104), but also the physical image of the reviewer (104). In such embodiments, the voice review (122) may be stored in a format that allows for maintaining audio-video files. Alternatively, one skilled in the art will appreciate that the voice review (122) may be maintained in textual format and only received in auditory format.

The voice review (122) is associated with a voice review identifier (124) in accordance with one or more embodiments of the invention. The voice review identifier (124) uniquely identifies the voice review (122). The voice review identifier (124) may correspond to an alphanumeric string, an error code that is obtained from the voice review (122), or any other such device that identifies the voice review (122).

The voice review (122) is also associated with an entity identifier (126) and an entity rating (128) in accordance with one or more embodiments of the invention. The entity identifier (126) corresponds to a device that identifies the entity (102), which is the subject of the review. Specifically, the entity identifier (126) may correspond to the name, a bar code, a store unit number, or any other identification mechanism for identifying the entity (102).

The entity rating (128) corresponds to a rating identifying how positively or negatively a reviewer (104) feels about the entity (102). Specifically, the entity rating (128) may correspond to a star-rating system, numeric value rating system, or any other such rating system known to those skilled in the art. Those skilled in the art will appreciate that the entity rating (128) is optional and therefore may be associated with all, part, or none of the voice reviews.

In one or more embodiments of the invention, the review map (116) also includes a voice review rating (not shown). A voice review rating corresponds to a rating of the voice review itself from any reviewer that did not create the voice review (122). Specifically, the voice review rating may identify how reliable the voice review (122) and the reviewer (104) associated with the voice review (122) are to the person listening to the voice review (122). The voice review rating may also correspond to a rating system, or to a voice or text review (not shown) of the voice review (122).

Continuing with the review framework (108) of FIG. 1, the review map (116) is operatively connected to a review engine (118) in accordance with one or more embodiments of the invention. The review engine (118) corresponds to a logical component that includes functionality to manage the review map (116). In one embodiment of the invention, the review engine (118) includes a mapping engine (130) and a language filter (132).

The mapping engine (130) includes functionality to retrieve and store at least one voice review (122). Further, in one or more embodiments of the invention, the mapping engine (130) includes functionality to identify the entities that correspond to a query received from an evaluator (110) (described below). For example, a query may specify a collection of attributes. The mapping engine (130) may also include functionality to identify the entities having the specified attributes and obtain the voice reviews corresponding to the identified entities. Further, the mapping engine (130) may also include functionality to obtain information, such as a specification, frequently asked question (FAQ) sheet, text review, etc. for the entities from the review map (116).

In addition, in one or more embodiments of the invention, the review engine (118) includes a language filter (132). A language filter (132) includes functionality to review the voice review (122) and remove all or part of the voice review (122) that contains any compromised information (e.g., inappropriate language or marketing information received directly from the entity (102), etc.). Alternatively, rather than removing any portion of the voice review, the language filter (132) may include functionality to attach a language rating, such as 'G', 'PG', 'R', etc., to all or a portion of the voice review that contains the compromised information.

The review engine (118) may also include a text converter (not shown). A text converter includes functionality to translate the voice of the reviewer into text. By translating the voice review into text, a reviewer (104) may submit a voice review using a communication device (e.g., a phone) without requiring that an evaluator device (112) (described below) include a speaker.

In one or more embodiments of the invention, the review framework (108) also contains an identity manager (120). The identity manager (120) includes functionality to store and manage a reviewer identity (136) and an evaluator identity (134). The reviewer identity (136) may include access information (e.g., username, password, or other such information to log into the framework) for the reviewer (104) and/or reviewer device (106). Further, the review identity (136) may also include preference information for the reviewer (104). For example, the reviewer identity (136) may include information about a user interface for the reviewer (104) or any other such information.

In addition, in one or more embodiments of the invention, the reviewer identity (136) may include earned promotional values (not shown) for the reviewer (106). An earned promotional value corresponds to coupons, entrances into drawings, etc. that a reviewer can obtain by submitting a voice review.

An evaluator identity (134) may include access information for the evaluator (110) (described below) and/or evaluator device (112). Further, the evaluator identity (134) may include preference information for the evaluator (110). For example, the evaluator identity (134) may include information about a user interface for the evaluator (110), a location of the evaluator (110), the type of entities in which an evaluator (110) is interested, or any other such information. Further, in one or more embodiments of the invention, the evaluator identity (110) may also include billing information. For example, the review framework (108) may provide a billable service to evaluators and/or entities.

Continuing with FIG. 1, an evaluator (110) corresponds to any individual that seeks to evaluate the entity (102) and perform an action related to the entity (102). For example, an evaluator (110) may correspond to a shopper, an investor, a potential member, an interested user, etc.

An evaluator device (112) is typically used by the evaluator (110) to evaluate the entity (102) in accordance with one or more embodiments of the invention. In one or more embodiments of the invention, the evaluator device (112) corresponds to hardware and/or software required to output a voice review (122) on a recorded medium (e.g., electronic signals, magnetic signals, any type of memory, etc). For example, the evaluator device (112) may correspond to a cellular phone, personal digital assistant (PDA), landline-based phone, global positioning system (GPS), any device with a speaker, computer, a voice review specific device, or any other such device. One skilled in the art will appreciate that the evaluator device (112) may be owned by the evaluator (110), associated with the entity (102), or associated with a third party.

Further, the evaluator device (112) may include a user interface (not shown) or include functionality to provide access to a user interface. In one or more embodiments of the invention, the user interface includes functionality to identify the evaluator (110) and provide a mechanism for an evaluator (110) to query the review framework for a voice review (122) corresponding to the entity (102).

Those skilled in the art will appreciate that while FIG. 1 shows one type of configuration for voice reviews, other configurations are also possible. For example, in alternative embodiments of the invention, the reviewer device (106) and the evaluator device (112) may correspond to the same physical device. Further, the entity (102) may be directly connected to the review framework (108). Additionally, components of the identity manager may be located on each of the reviewer device (106) and the evaluator device (112) respectively.

Further, those skilled in the art will appreciate that while FIG. 1 shows a centralized system for reviewing and evaluating an entity, a peer-to-peer system may also be used in accordance with one or more embodiments of the invention. For example, each voice review (122) may be physically located on the reviewer device (106) and/or evaluator device (112). Thus, the voice reviews may be distributed between a reviewer (104) and an evaluator (110) from the aforementioned devices.

In addition, those skilled in the art will appreciate that rather than having a review framework (108) for maintaining and accessing voice reviews (122), a reviewer (104) may record the voice review and share the voice reviews directly with the evaluator (110). In such scenario, the review framework (108) may not be required.

Figure 2:
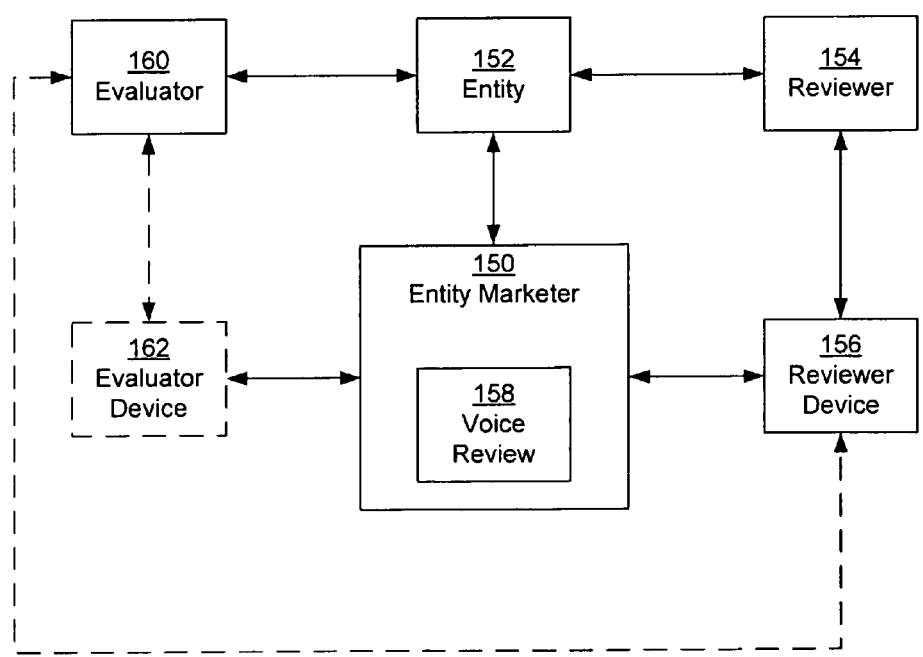
FIG. 2 shows a schematic diagram of a system for evaluating an entity using an entity marketer in accordance with one or more embodiments of the invention.

FIG. 2 shows a schematic diagram of a system for reviewing and evaluating an entity using an entity marketer (150) in accordance with one or more embodiments of the invention. As shown in FIG. 2, the system includes an entity (152), entity marketer (150), a reviewer (154), a reviewer device (156), an evaluator (160), and an evaluator device (162).

An entity (152) is similar to the entity (102) described in FIG. 1. Entity (152) is associated with an entity marketer (150). An entity marketer (150) corresponds to any type of marketing device for the entity (152) in accordance with one or more embodiments of the invention. For example, the entity marketer (150) may correspond to a web page, kiosk, interactive hotline, or any other type of marketing device for the entity (152). In one or more embodiments of the invention, the entity marketer (150) includes a voice review (158). For example, the voice review (158) may be referenced on a web page of the entity marketer (150), played by a speaker or other such device on the entity marketer (150), etc.

A voice review (158) is similar to the voice review (122) in FIG. 1. However, in one or more embodiments of the invention voice review (158) corresponds only to a positive review of the entity (152). Specifically, only voice reviews (158) that are positive about the entity (152) are included in the entity marketer (150) in accordance with one or more embodiments of the invention.

A reviewer (154) is similar to the reviewer (104) described in FIG. 1. In one or more embodiments of the invention, the reviewer (154) is given promotional compensation for speaking the voice review (158). For example, the reviewer (154) may be entered in a drawing, given coupons, or given any other type of promotional items. Accordingly, the voice review (154) generated by the reviewer (154) may be biased towards the entity (152).

The reviewer (154) and the marketer (150) are operatively connected to a reviewer device (156). The reviewer device (156) is similar to the reviewer device (106) of FIG. 1. In one or more embodiments of the invention, the reviewer device (156) is owned by the entity marketer (150) or a person or business associated with the entity marketer (150). For example, the reviewer device (156) may correspond to an audio device that a marketing employee (not shown) associated with the entity (152) uses to request and record a voice review (158).

Continuing with FIG. 2, the evaluator (160) is similar to the evaluator (110) of FIG. 1. However, the evaluator (160) may evaluate the entity (152) either passively or actively. Specifically, rather than requesting the voice review (158), the voice review (158) may be automatically outputted for the evaluator (160) regardless of a desire to evaluate the entity (152).

The evaluator (160) is typically uses an evaluator device (162). The evaluator device (162) is similar to the evaluator device (112) of FIG. 1. In one or more embodiments of the invention, the evaluator device (162) is owned by the entity marketer (150) or a person or business associated with the entity marketer (150). For example, the evaluator device (162) may correspond to an audio output device connected to the entity marketer. One skilled in the art will appreciate that the reviewer device (156) and the evaluator device (162) may correspond to the same physical device.

Figure 3:
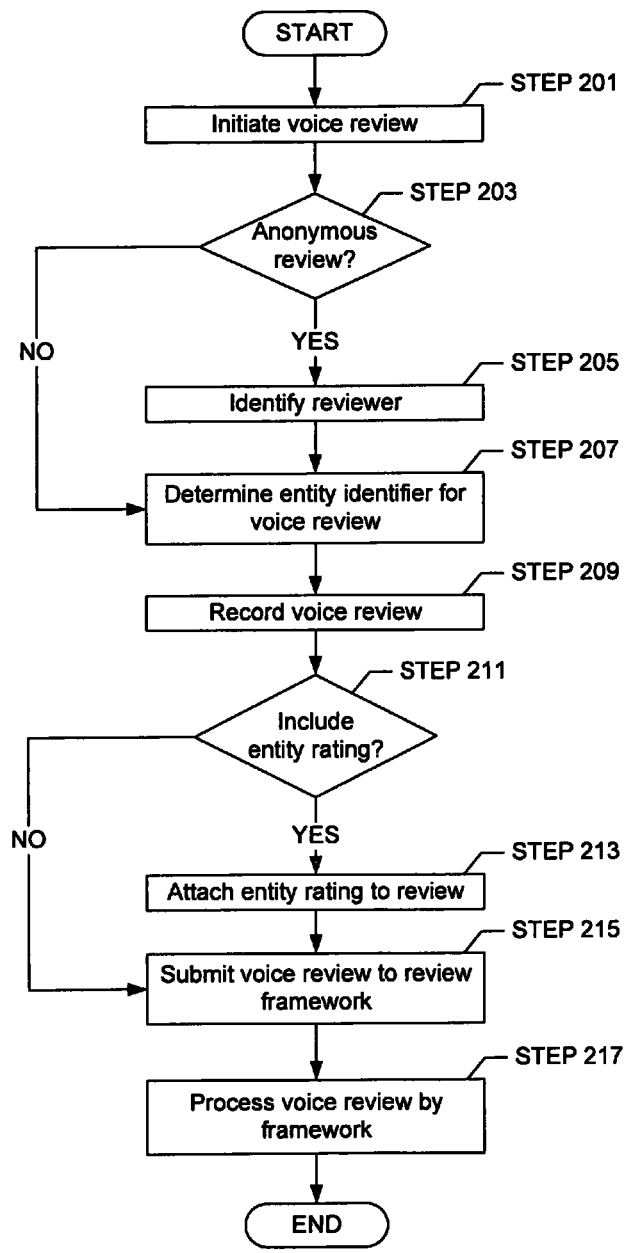
FIG. 3 shows a flowchart of a method for reviewing an entity in accordance with one or more embodiments of the invention.

FIG. 3 shows a flowchart of a method for reviewing an entity in accordance with one or more embodiments of the invention. Initially, the voice review is initiated (Step 201). In one or more embodiments of the invention, the voice review is initiated when the reviewer has a feeling or emotion regarding the entity (or service of the entity) to share or when the reviewer is approached (either directly or discreetly) by an entity marketer. Initiating the voice review may include calling a dedicated number associated with the entity, turning on a review device, accessing an application associated with voice reviews, or otherwise contacting the review framework. In one or more embodiments of the invention, the voice review is initiated by the reviewer. Alternatively, an employee or service associated with the entity marketer may initiate the voice review. Further, in one or more embodiments of the invention, the voice review may be initiated anywhere, such as while the reviewer is at the physical location of the entity, the home of the reviewer, or any other location.

After the voice review is initiated, a determination is made whether the voice review is an anonymous voice review (Step 203) in accordance with one or more embodiments of the invention. The voice review is anonymous when the reviewer does not want to be identified. Determining whether the voice review is anonymous may be performed by requesting input from the user indicating whether the voice review is anonymous. Alternatively, all voice reviews may be anonymous to protect the identity of the reviewer or all reviewers may be identified to ensure authenticity of the voice review.

If the voice review is not anonymous, then the reviewer is identified (Step 205). Identifying the voice review may be performed by requesting login information from the reviewer (e.g., username and/or password), performing a speech analysis of the reviewer to determine the unique voiceprint of the reviewer, identifying the reviewer device, or performing virtually any other technique for identifying the reviewer.

Once the reviewer is identified, or if the voice review is anonymous, then the entity identifier of the voice review is determined (Step 207). Determining the entity identifier of the voice review may be performed by requesting the information from the reviewer, identifying a physical location of reviewer and extrapolating the entity identifier from the physical location, etc. For example, if the reviewer submits the voice review via a communication device (e.g., a phone), then the reviewer may be led through a series of questions to identify the entity. In another example, the reviewer may be instructed to identify the entity while reviewing the entity. Using a text to speech conversion, the entity identifier may be extrapolated from the voice review.

Continuing with FIG. 3, the voice review is recorded (Step 209). At this stage, the reviewer provides input (generally in the form of spoken words) and the voice review created. Those skilled in the art will appreciate that recording the voice review may be performed at any stage after the voice review is initiated. For example, the reviewer may record the voice review while at the location of the entity and then connect to the framework to be identified and to identify the entity while at home.

Further, those skilled in the will appreciate that multiple reviewers may record the voice review. Specifically, a single voice review may include voices from a two or more reviews.

Next, a determination is made whether an entity rating is included with the voice review (Step 211). The reviewer may generate an entity rating or the entity rating may be determined from the inflections and words used by the reviewer.

If an entity rating is included with the voice review, then the entity rating is attached to the voice review (Step 213). Specifically, the entity rating is associated with the voice review in memory. For example, the entity rating may be added to metadata associated with the voice review, the voice review reference the entity rating, etc.

Once the entity rating is attached to the voice review, or if the entity rating is not included, then the voice review is submitted to the review framework (Step 215) in accordance with one or more embodiments of the invention. Specifically, in one or more embodiments of the invention, a file containing the voice review and associated information is submitted to the review framework in accordance with one or more embodiments of the invention. Alternatively, sending the voice review to the review framework may be performed incrementally as the entity is reviewed. For example, the user interface may be connected to the framework.

After the voice review is sent and received by the framework, the voice review is processed by the framework (Step 217) in accordance with one or more embodiments of the invention. Processing the voice review includes storing the voice review in a review map (described above in connection with FIG. 1). In addition, in one or more embodiments of the invention, the voice review may be processed by such acts as filtering for inappropriate language and a converting the voice review from speech to text.

Figure 4:
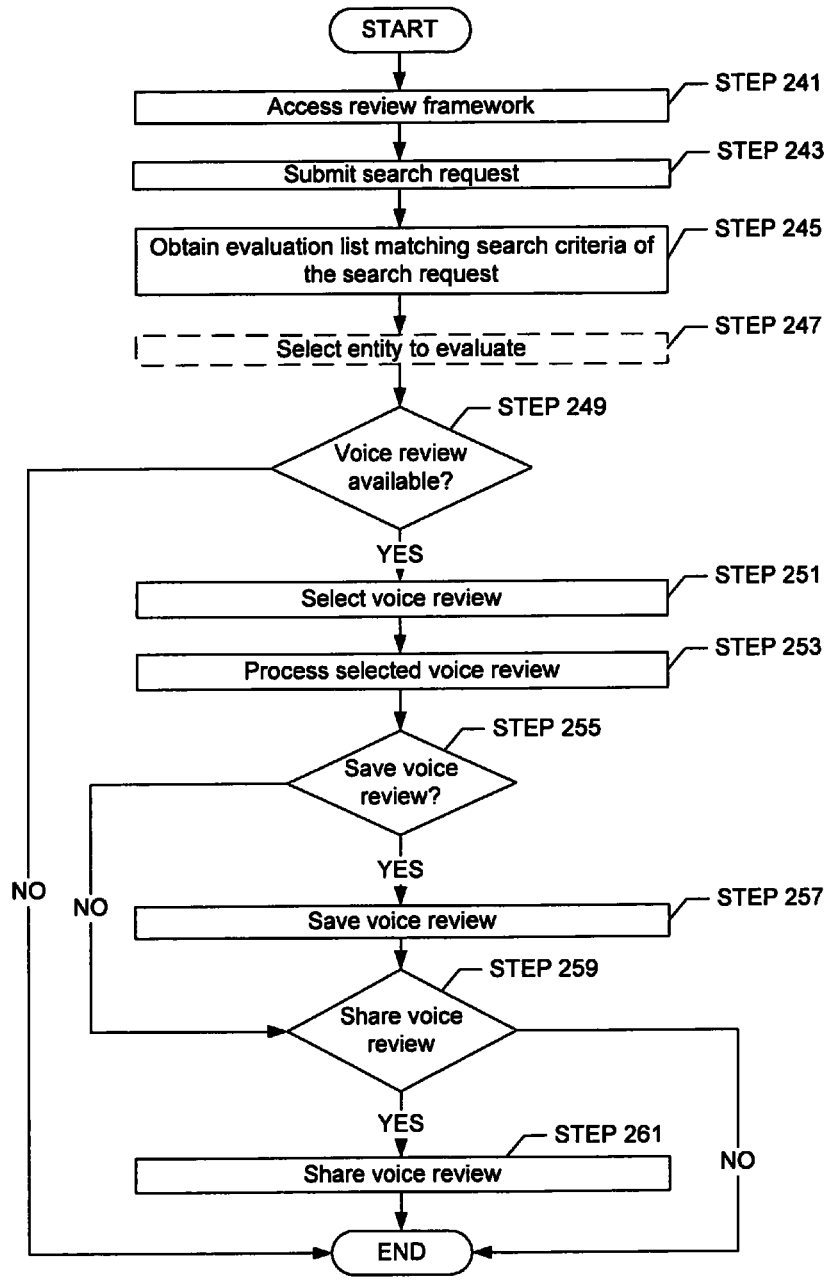
FIG. 4 shows a flowchart of a method for evaluating an entity in accordance with one or more embodiments of the invention.

After the voice review is available for an evaluator, then the entity can be evaluated by an evaluator. FIG. 4 shows a flowchart of a method for evaluating an entity in accordance with one or more embodiments of the invention. Initially, the review framework is accessed (Step 241). Accessing the review framework may be performed, for example, by an evaluator calling the framework (e.g., using a communication device, such as a phone, etc.), accessing the framework through a GPS, opening a web page user interface of the framework, or performing any other such technique.

Next, a search request is submitted (Step 243). In one or more embodiments of the invention, the search request specifies the attributes of the entity and/or the voice review. For example, the search request may specify that the evaluator is only interested in entities in a certain category or physically located in a certain location. As another example, in the case in which an evaluator is an investor, the search request may include a minimum amount of capital and maximum amount of debts of the entity.

In the scenario that the search request also includes parameters about the voice review, the search request may also include a limitation on the type of inappropriate language in the voice review, the type of natural human language of the voice review (e.g., English, Chinese, German, etc.), or characteristics of the reviewer (e.g., age, socioeconomic background, etc.).

After the search request is submitted, an evaluation list is obtained that matches the search request (Step 245). Specifically, in one or more embodiments of the invention, the framework determines the entities matching the voice request and creates an evaluation list. The evaluation list is submitted back to the evaluator.

Next, an entity from the evaluation list is selected to evaluate (Step 247) in accordance with one or more embodiments of the invention. Specifically, the evaluator selects an entity from the list. In order to select the entity from the list, the evaluator may click on the entity, type the entity name, speak the entity name, or perform any other similar technique. Alternatively, with each entity in the evaluation list, a listing of voice reviews may be displayed below the entity. In such scenario, the evaluator is able to directly choose a voice review.

Continuing with FIG. 4, after the entity is selected, a determination is made whether a voice review is available for the entity (Step 249). If a voice review is not available, then any information that is available about the entity may be obtained by the evaluator.

Alternatively, if voice reviews are available, then a voice review is selected (Step 251). The voice review may be selected by the evaluator requesting the voice review by clicking on a button associated with the voice review, speaking an identifier associated with the voice review, or performing any other technique know in the art for selecting items from a list.

Next, the voice review is processed (Step 257). Specifically, the evaluator may listen to the voice review, or perform any other similar action in relation to the voice review. At this stage, the evaluator is able to listen to inflections of the voice of the reviewer and the type of voice of the reviewer. Specifically, the evaluator is able to determine whether the reviewer is believable or fraudulent, whether the reviewer is passionate about the review, or other such information of the voice review. Further, the evaluator is able to evaluate characteristics about the reviewer when the reviewer is reviewing. For example, the evaluator may be able to determine gender, educational level, social level, intoxication levels, or any other such items that an individual can ascertain from a speech.

Continuing with FIG. 4, after processing to the voice review, a determination is made whether to save the voice review (Step 255) in accordance with one or more embodiments of the invention. Specifically, the evaluator may determine that the voice review should be easily accessible for a later time. For example, the evaluator may decide to keep the voice review for a particular restaurant after deciding not to go immediately to the restaurant until a later date. If the evaluator decides to save the voice review, the voice review is saved (Step 257). The voice review may be saved locally on the evaluator device, or a reference to the voice review may be added in a space associated with only the evaluator in the review framework.

Regardless of whether the voice review is saved, a determination is made whether to share the voice review (Step 261) in accordance with one or more embodiments of the invention. Specifically, the evaluator may decide to share the voice review with friends. For example, if a group of people is determining where to go for lunch, one of the people (i.e., the evaluator) may listen to a voice review about a possible restaurant and share the voice reviews with the group for everyone in the group to decide.

Accordingly, if a determination is made to share the voice review, then the voice review is shared (Step 261). Specifically, at this stage, the evaluator may submit a list of people who should receive the voice review. Next, the voice review may be sent to the list via email or phone, or a reference to the voice review may be added to the review framework in a position that is associated with all of the people.

Those skilled in the art will appreciate that the actual user interface for the voice review may fluctuate. For example, the user interface may be specific to the type of device accessing the voice review, based on new knowledge about user interfaces, or change for virtually any other reason. Accordingly, the steps in FIG. 4 may be performed in virtually any order, skipped, or new steps added based on the user interface.

Figure 5:
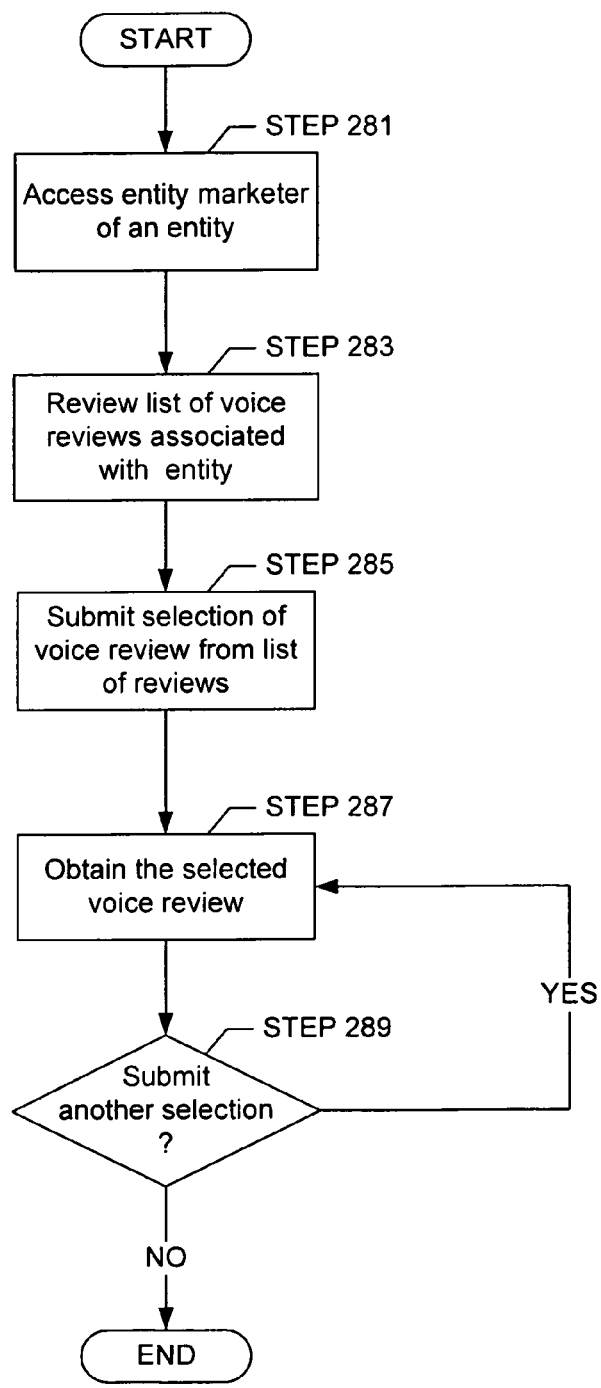
FIG. 5 shows a flowchart of a method for evaluating an entity using an entity marketer in accordance with one or more embodiments of the invention.

FIG. 5 shows a flowchart of a method for evaluating an entity using an entity marketer in accordance with one or more embodiments of the invention. Initially, the entity marketer of the entity is accessed (Step 281). Accessing the entity marketer may be performed, for example, by calling the entity, using a kiosk, walking by a billboard with a speaker or other such advertisement, accessing a web page associated with the entity, or performing any other such method.

After the entity marketer is accessed, a list of voice reviews associated with the entity is reviewed (Step 283). In one or more embodiments of the invention, the entity marketer displays only favorable voice reviews in an easy to access manner. Next, a selection of a voice review is submitted from the list of reviews (Step 285). Alternatively, all voice reviews may be playing. In particular, a speaker associated with the entity marketer may simply play all review rather than waiting for a selection from the evaluator.

Next, the evaluator obtains the voice review from the selection (Step 287). Specifically, the voice review may be automatically downloaded on the evaluator device, played for the evaluator, etc. After obtaining the voice review, a determination is made whether another selection is submitted (Step 289). If another selection is submitted, then the evaluator obtains the next selection of a voice review from the list (Step 287).

In the following example, consider the case in which, within a four-block radius, a city contains six Indian restaurants that have each been open for more than a year. In the course of the year, patrons, friends, and family of the restaurants' owners, and the general public visit the restaurants. Because the restaurants are in competition for customers, each restaurant owner asks customers to submit a voice review to a third party framework. The general public who are unhappy with the restaurant and know about the third party framework also submit voice reviews. In the example, at least one member of the general public receives great service but finds the food substandard. Accordingly, while eating, the member calls the third party and submits the review.

Continuing with the example, as voice reviews are being received, voice review are listened to by evaluators and rated for authenticity. Accordingly, voice reviews from friends and family member that show an obvious bias are removed in the course of the year.

At the end of the year, a group of friends decides to have an evening in the city. In the middle of the trip to the city, the group of friends decides that they are hungry and Indian food is ideal for such hunger. Accordingly, the driver of the group turns on the GPS in the car and submits a request for Indian Restaurants in the area. Because the car is within the aforementioned four-block radius, the six restaurants are displayed on a map of the GPS. In order to narrow the results, the driver requests that only the Indian restaurants with a waiting time less than 45 minutes are shown on the map.

Once the map is returned, the map displays the four Indian restaurants that encompass all requirements of the driver. Accordingly, the driver commands the GPS unit to play each voice review associated with each restaurant. As the group listens to the voice reviews, the group is able to tell which reviews are fraudulent, which wait staff is good, which restaurant has the best atmosphere and food, etc. Accordingly, the group is able to more easily and accurately determine which restaurant to dine at based on expense, wait staff, food, and atmosphere.

Figure 6:
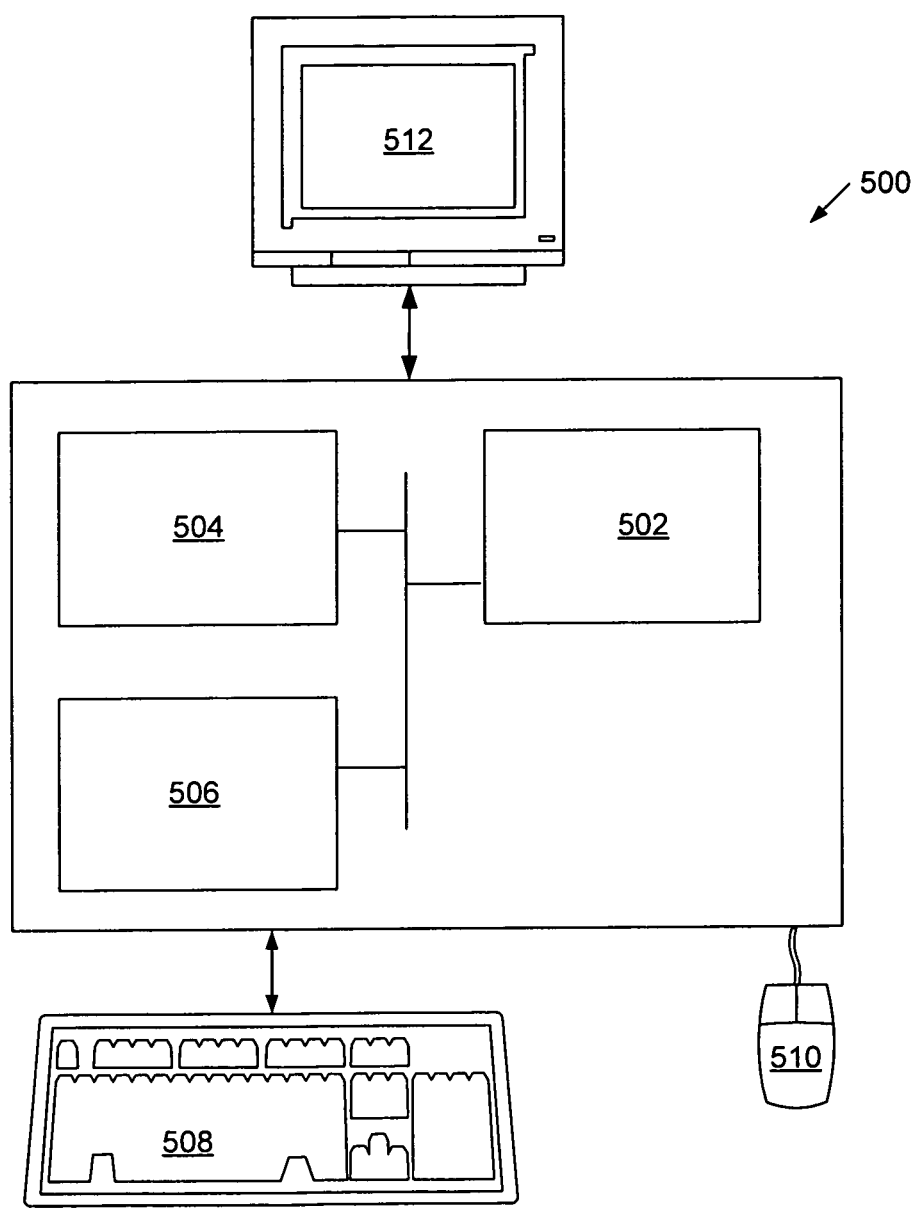
FIG. 6 shows a computer system in accordance with one or more embodiments of the invention.

The invention may be implemented on virtually any type of computer regardless of the platform being used. For example, as shown in FIG. 6, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., review engine, identity manager, review map) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Embodiments of the invention allow for a reviewers and evaluators to easily review and evaluate entities. In particular, barriers, such as waiting to generate the review and typing time, for a reviewer reviewing an entity are removed. Furthermore, an evaluator of voice reviews may obtain the voice review left by the reviewer. With voice reviews, an evaluator is able to listen to natural inflections in the voice to appreciate the review (e.g., determine the emotion behind the review, whether the review is fraudulent, etc.). Moreover, an evaluator is able to evaluate the entity while also subconsciously evaluating the reviewer.

Regardless of whether an entity marketer is used, the voice review allows evaluators to determine the authenticity of the reviewer by the inflections in the voice. Further, because the voice review is auditory, both the reviewer and the evaluator may do other activities while speaking or listening to the voice review. For example, a reviewer can call in the voice review using a cell phone while the reviewer is at the physical location of the entity. Thus, reviewing and evaluating an entity may be performed anywhere using virtually any type of device In addition, because many of the natural barriers of formulating a review are removed, entities and companies associated with the entities are able to obtain a voice reviews easily. Specifically, the ease of submitting a voice review creates an environment in which a customer may be willing to submit feedback to the entity. Accordingly, the entities and companies of the entities can improve the quality for their customers.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for providing voice reviews for an entity comprising:
   receiving, by a review framework separate from the entity, a call from a first user reviewing the entity;
   identifying an entity identifier for the entity;
   recording, during the call, a voice review comprising comments from the first user about the entity, wherein the voice review comprises an audio component and a video component;
   storing the voice review and the entity identifier in a review map within the review framework, wherein the voice review is included in the voice reviews that are stored in the review map;
   processing, by a computer processor executing the review framework, the voice review to obtain a language rating defining an audience appropriate maturity level of the comments in the voice review;
   receiving, from a second user in a vehicle, a search request comprising attributes associated with the voice reviews, wherein the attributes comprise a limitation on a type of language;
   comparing, by the computer processor, the voice review and the attributes to generate a match, wherein the comparing comprises matching the limitation on the type of language to the language rating of the voice review;
   including the voice review in an evaluation list based on the match;
   sending, based on a selection from the evaluation list by the second user, the voice review to the second user to evaluate the entity, wherein sending the voice review comprises:
      displaying the entity and the evaluation list on a map of a global positioning system (GPS) in the vehicle;

receiving, from the second user and using the GPS, the selection of the voice review from the evaluation list in response to displaying the evaluation list; and playing back, using the GPS, the voice review to the second user;

receiving, from the second user, by the computer processor, a voice review rating defining a reliability factor of the comments in the voice review and a reliability factor of the first user to the second user in evaluating the entity, wherein the voice review rating is based at least on the second user listening to the voice review;

storing the voice review rating and the language rating with the voice review, wherein the voice review rating and the language rating are used by a third user to determine whether to listen to the voice review.

2. The method of claim 1, wherein recording the voice review is performed at a physical location associated with the entity.

3. The method of claim 1, further comprising:

determining an entity rating for the entity by analyzing inflections and words used by the first user in the comments; and submitting the entity rating with the voice review, wherein the attributes further comprise at least one selected from a group consisting of a category of the entity, a physical location of the entity, a minimum amount of capital of the entity, a maximum amount of debts of the entity, a type of natural human language used in the voice reviews, and characteristics of reviewers of the voice reviews, the characteristics comprising at least one selected from a group consisting of age and socioeconomic background.

4. The method of claim 1, further comprising:

identifying a physical location of the first user; and forwarding an evaluation request for the entity to the first user based on the physical location of the first user.

5. The method of claim 4, wherein forwarding the evaluation request for the entity is from an entity marketer of the entity.

6. The method of claim 1, wherein processing the voice review comprises:

filtering the voice review to remove predefined language.

7. The method of claim 1, wherein processing the voice review comprises:

converting the voice review to text.

8. The method of claim 1, wherein the attributes further comprise a location and a category of the entity, and wherein comparing the voice review further comprises matching the location and the category of the entity to the voice review.

9. The method of claim 1, further comprising:

saving the voice review in at least one selected from a group consisting of the GPS and a space associated with the second user in the review framework; and sending, based on instructions from the second user, the voice review to a third user to share the voice review.

10. The method of claim 1, wherein sending the voice review comprises sending a textual copy of the voice review.

11. The method of claim 1, further comprising receiving, from the second user, a critique of the voice review.

12. A system for providing information about an entity comprising:

a computer processor of a global positioning system (GPS) in a vehicle;

a review framework configured to:

receive a call from a first user reviewing the entity;

identify an entity identifier for the entity;

record, during the call, a voice review comprising comments from the first user about the entity;

store the voice review and the entity identifier in a review map within the review framework, wherein the voice review is included in the voice reviews that are stored in the review map;

process the voice review to obtain a language rating defining an audience appropriate maturity level of the comments in the voice review;

receive, from a second user in the vehicle, a search request comprising attributes associated with the voice reviews, wherein the attributes comprise a limitation on a type of language;

compare the voice review and the attributes to generate a match, wherein the comparing comprises matching the limitation on the type of language to the language rating of the voice review;

include the voice review in an evaluation list based on the match; and send the evaluation list to the second user to evaluate the entity; and a review engine configured to execute on the computer processor and configured to:

display the entity and the evaluation list on a map of the GPS in the vehicle;

receive, from the second user using the GPS, a selection of the voice review from the evaluation list in response to displaying the evaluation list; and play back, using the GPS, the voice review to the second user;

receive, from the second user, a voice review rating defining a reliability factor of the comments in the voice review and a reliability factor of the first user to the second user in evaluating the entity, wherein the voice review rating is based at least on the second user listening to the voice review; and store the voice review rating and the language rating with the voice review, wherein the voice review rating and the language rating are used by a third user to determine whether to listen to the voice review.

13. The system of claim 12, wherein the review map comprises at least one attribute of the entity.

14. The system of claim 13, wherein the review engine is further configured to:

receive a physical location of the third user selecting the voice review; and identify the entity near a physical location of the third user based on the at least one attribute of the entity.

15. The system of claim 12, further comprising:

a website for receiving the voice review and outputting the voice review.

16. The system of claim 12, further comprising:

an identity manager configured to identify the first user and associate a voice review of the plurality of voice reviews with the first user.

17. The system of claim 12, wherein the review engine is further configured to filter the voice review to remove predefined language.

18. The system of claim 12, wherein the review engine is further configured to convert the voice review to text.

19. The system of claim 12, wherein the review map comprises a data structure comprising:

a first element comprising an entity identifier of the entity;

a second element comprising a voice review of the plurality of voice reviews; and a third element comprising a voice review identifier associated with the voice review,
wherein at least one selected from a group consisting of the first element, the second element, and the third element are accessed to evaluate the entity.

20. The system of claim 12, further comprising:
a reviewer device for reviewing the entity and configured to:
  identify an entity identifier for the entity;
  record a voice review for the entity associated with the entity identifier; and
  submit the voice review and the entity identifier to the review framework.

\* \* \* \* \*